S. P. SMITH.
Straw Cutter.
No. 20,224.
Patented May 11, 1858.
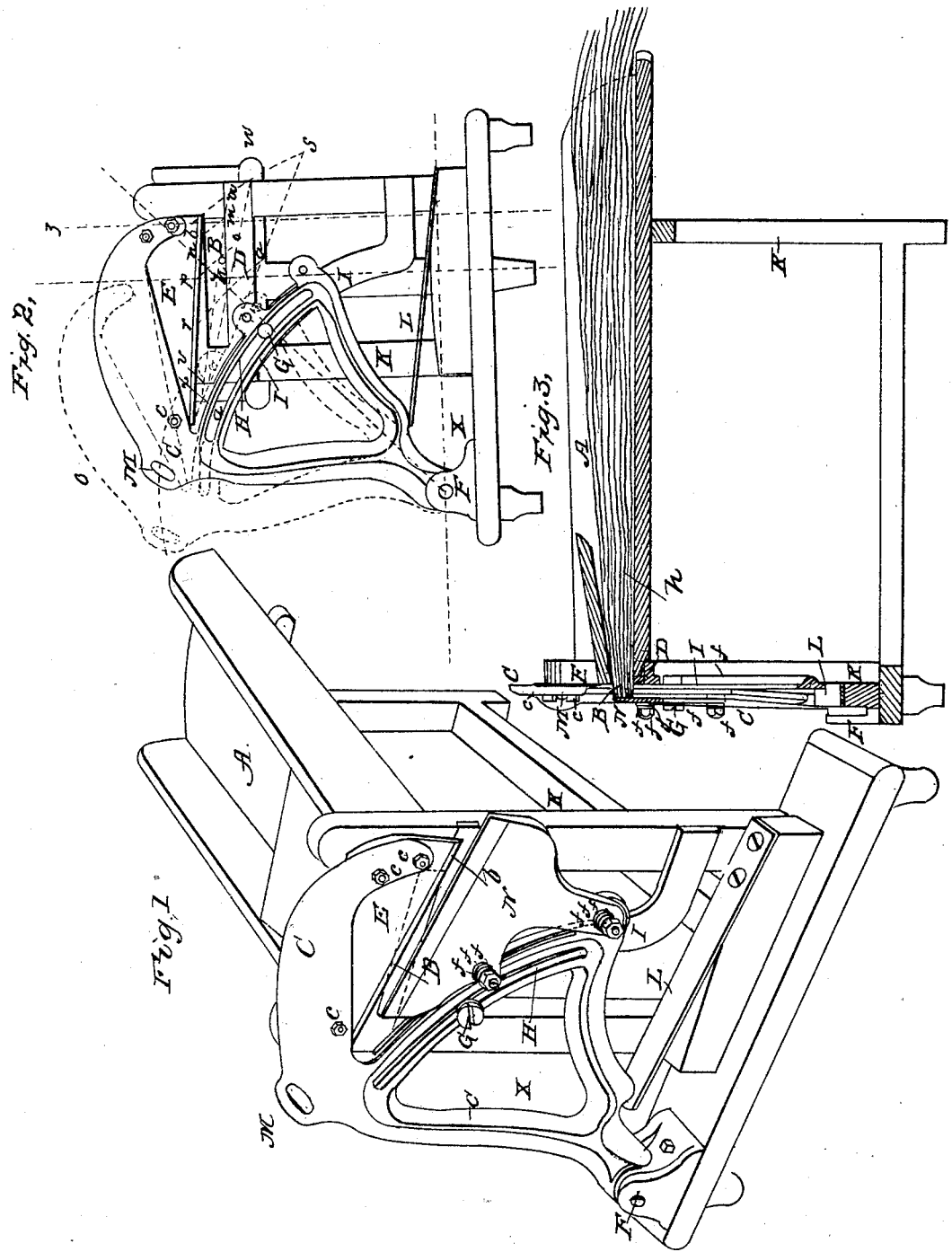

UNITED STATES PATENT OFFICE.

SOLOMON P. SMITH, OF CRESCENT, NEW YORK.

STRAW-CUTTER.

Specification of Letters Patent No. 20,224, dated May 11, 1858.

*To all whom it may concern:*

Be it known that I, SOLOMON P. SMITH, of the village of Crescent, in the county of Saratoga and State of New York, have invented a new and useful improvement in straw-cutters of that well-known class wherein the straw is cut by a knife mounted upon an arm vibrated by hand in a vertical or nearly vertical plane across the mouth of a horizontal or nearly horizontal straw-box; and I do hereby declare that the following is a full and exact description of the same, reference being had to the annexed drawings, making a part of this specification, in which—

Figure 1 is a perspective view of my improved straw-cutter; Fig. 2 a front elevation of the same,—the gage for regulating the length of the cut straw being removed; and Fig. 3 a longitudinal section at the line $z\ y$, in Fig. 2.

The same letters refer to like parts in all the figures.

A is the straw-box mounted upon a frame K, at a suitable height to allow the operator when standing on the floor at one side, X, of the machine, to intermittingly feed the straw by one hand through the mouth B of the straw-box, while by the other he vibrates the weighty knife-arm C,—best made of cast iron. The mouth B is provided with the usual fixed metallic shear-plate, D, along its lower side, for the knife E fast on the arm C, to work against. L is a recoil spring arranged so as to enable the operator to employ the surplus momentum of the knife-arm to cause the return of the same to its elevated position ready for a new stroke.

In my improved straw-cutter the fixed axis, F, of the hand-vibrated knife-arm, C, is placed at such a distance from, and so much lower than, and to one side of the mouth of the straw-box; and the knife E is arranged upon the arm C in such a position that, while the end $b$, farthest from the axis, F, commences cutting first, the knife makes a drawing and a shearing cut across every part of the mouth of the straw box,—draws or tends to draw the straw or other material to be cut toward or into the angle formed by the edge of the knife and the shear D, instead of shoving or tending to push the straw away from or out of that angle, as would be the case if the knife merely made a shearing cut.

To produce what I consider the best drawing and shearing cut I arrange the axis of the knife-arm as far or about as far from the mouth of the straw-box as the latter is above the platform where the operator stands, and as much or about as much lower than the straw-box as to one side of it, and arrange the knife in such a position upon the arm that its edge, as it shears toward the axis F shall form an angle of from about 10 to 15 degrees with the shear D, as shown in Fig. 2; in which figure the lines $x\ w$, $v\ u$, and $t\ s$, indicate different positions, and the dotted lines $r\ q$, $p\ o$, and $n\ m$, the course of the knife edge in its passage through the straw. But the knife-edge may form a somewhat less or greater angle than this, with the shear D, and the position of the axis of the knife arm relatively to the mouth of the straw-box may vary some from that just indicated as the best; and yet the required drawing and shearing cut be given. This mode of making the knife produce the drawing and shearing cut, also enables the operator, while he stands on that side of the machine where the axis of the knife-arm is located and feeds the straw by one hand, to directly grasp the arm near the knife by his other hand, without the intervention of any movable handle, and work it the requisite distance by moving his hand in a course but little inclined from a horizontal direction; whereby the operator is enabled to work the knife the necessary distance with much less effort than he could if his hand was required to move an equal distance in a nearly vertical course.

The knife E, which should have a straight or nearly straight edge for easy grinding, is, while cutting, kept close against the shear-plate D by means of the headed bolt G passing through the slot $a$ in the knife-arm-segment H, into the arc I, fast on the frame of the machine,—the bolt G being arranged in or nearly in a line joining the middle of the mouth of the straw-box and the axis of the knife-arm. But instead of this arrangement of parts for keeping the knife close against the mouth of the straw-box any other suitable device may be employed without affecting the nature of my improvement.

The knife E should be fastened upon the arm by means of screw-bolts, $c, c, c,$ having countersunk heads, or by other suitable means which will allow the knife to be taken from the heavy arm for grinding, and which shall not prevent the knife from working close against the mouth of the straw-box.

N is a gage for regulating the distance that the straw is fed forward each time. This gage is bolted to the segment H of the knife-arm so that the gage moves with the knife and is opposite to the mouth of the strawbox when the knife is elevated. By the use of washers, $f$, $f$, $f$, the gage is set at different distances from the mouth of the straw box when the straw is to be cut different lengths. However, this gage is not essential to my improved straw-cutter; for a skilful operator can feed the straw forward with sufficient regularity without it.

In using the machine represented in the annexed drawings, the operator, standing at one side of it, as at X, first grasps the handpiece M with his right hand, draws the knife-arm to its elevated position shown by the dotted lines O in Fig. 2,—then feeds the straw forward with his left hand until it strikes the gage N or projects out of the mouth suitably, and then, with a quick, strong push against the knife-arm, strikes the blade through the straw, thereby giving such excess of momentum to the knife-arm that the latter is forced back by the recoil-spring L to the elevated position O where he retains it with little or no effort until he has again fed forward the straw, when he again strikes the blade through the straw, the recoil spring reacts as before, and so the process continues.

I am well aware that straw-cutters have been heretofore constructed in which the straight hand-vibrated knife was fastened upon a rigid arm hung at one end upon a fixed pivot placed to one side of and more or less lower than the mouth of the straw box. An example is shown in No. 12,407 of United States Patents. But such previously made straw-cutters are essentially different from the one herein described; for they do not produce the drawing and shearing cut across the whole mouth of the straw-box. I am also aware that several complicated methods of making a straight knife, vibrated or reciprocated by hand, give a drawing and shearing cut across the mouth of the strawbox have been heretofore produced. Examples are shown in Nos. 15,333 and 18,946 of United States Patents. But those modes are essentially different from my method of making the knife produce the drawing and shearing cut; for in no one of them is the drawing and shearing cut produced across the whole mouth of the straw box by a knife rocked upon a fixed pivot and consequently always moving in the arc of a circle. And, the simple mode in which the knife of my machine is made to give the drawing and shearing cut, and at the same time is worked with ease by the operator while feeding the straw by one hand, (which mode requires only one movable piece, and that is hung on a pivot,) allows my improved straw-cutter to be constructed at a cheaper rate, and to be worked with less friction and wear of the parts, and consequently with a less expenditure of power, than those which require two or more movable parts to enable the operator while feeding the straw with one hand to easily work the knife and make it give the drawing and shearing cut.

Having thus fully described the improved construction and operation of my straw-cutter, what I claim therein as my invention and desire to secure by Letters Patent is—

The arrangement of the arm, C, knife, E, and recoil spring, L, with straw-box, A, when constructed for operation conjointly, in the manner and for the purpose set forth.

SOLOMON P. SMITH.

Witnesses:
E. H. YULE,
A. F. PARK.